United States Patent
Gandhi et al.

(10) Patent No.: US 9,542,208 B2
(45) Date of Patent: Jan. 10, 2017

(54) SYSTEM AND METHOD TO INTEGRATE/SETUP MULTIPLE BRANDED APPLICATIONS IN THE SETUP WIZARD

(71) Applicant: Verizon Patent and Licensing Inc., Arlington, VA (US)

(72) Inventors: Sonal R. Gandhi, Basking Ridge, NJ (US); SM Masudur Rahman, Basking Ridge, NJ (US); Mohammad Raheel Khalid, Basking Ridge, NJ (US); Samir Vaidya, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 57 days.

(21) Appl. No.: 14/724,663

(22) Filed: May 28, 2015

(65) Prior Publication Data

US 2016/0350139 A1 Dec. 1, 2016

(51) Int. Cl.
*G06F 3/0484* (2013.01)
*G06F 9/44* (2006.01)
*G06F 9/445* (2006.01)

(52) U.S. Cl.
CPC ....... *G06F 9/44505* (2013.01); *G06F 3/04842* (2013.01); *G06F 8/38* (2013.01); *G06F 9/4403* (2013.01); *G06F 9/4443* (2013.01)

(58) Field of Classification Search
CPC ................ G06F 9/44505; G06F 9/4403; G06F 3/04842; G06F 9/4443; G06F 8/38
See application file for complete search history.

(56) References Cited

U.S. PATENT DOCUMENTS

| | | | |
|---|---|---|---|
| 7,596,785 B2 * | 9/2009 | Burkhardt | G06F 8/61 717/174 |
| 9,161,156 B2 * | 10/2015 | Mall | H04L 41/082 |
| 9,292,457 B2 * | 3/2016 | Menon | G06F 13/28 |
| 2005/0050539 A1 * | 3/2005 | Burkhardt | G06F 8/61 717/174 |
| 2012/0117534 A1 * | 5/2012 | Hershenson | G06F 8/38 717/105 |
| 2015/0149937 A1 * | 5/2015 | Khalid | G06F 9/4443 715/762 |

* cited by examiner

*Primary Examiner* — M Elamin

(57) ABSTRACT

Systems and methods for setting up carrier applications within a setup wizard are disclosed. In some implementations, a computing device launches an operating system setup wizard. The computing device launches, from the operating system setup wizard, a carrier-specific setup wizard. The computing device presents, from within the carrier-specific setup wizard, a setup interface for each of a plurality of carrier applications.

20 Claims, 6 Drawing Sheets

SYSTEM AND METHOD TO INTEGRATE/SETUP MULTIPLE BRANDED APPLICATIONS IN THE SETUP WIZARD

BACKGROUND

Some operating systems for mobile devices (e.g., Windows Phone®) do not provide inter-process communication (IPC) between applications during out-of-box experience (OOBE), immediately after a new computing device is powered on for the first time. Instead, applications must be launched by the user to allow them to use IPC.

Mobile carriers (e.g., Verizon Wireless®) provide applications, such as a contact management application or a text messaging application, to users of their services. These applications may require setup from the network or from the user prior to use. In order to initialize the phone at OOBE, the operating system provides a setup wizard application. However, the setup wizard application cannot communicate with the carrier-provided applications at OOBE because the carrier-provided applications have not been launched yet and, thus, cannot use IPC. As the foregoing illustrates, a new approach for setting up carrier-provided applications at OOBE may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
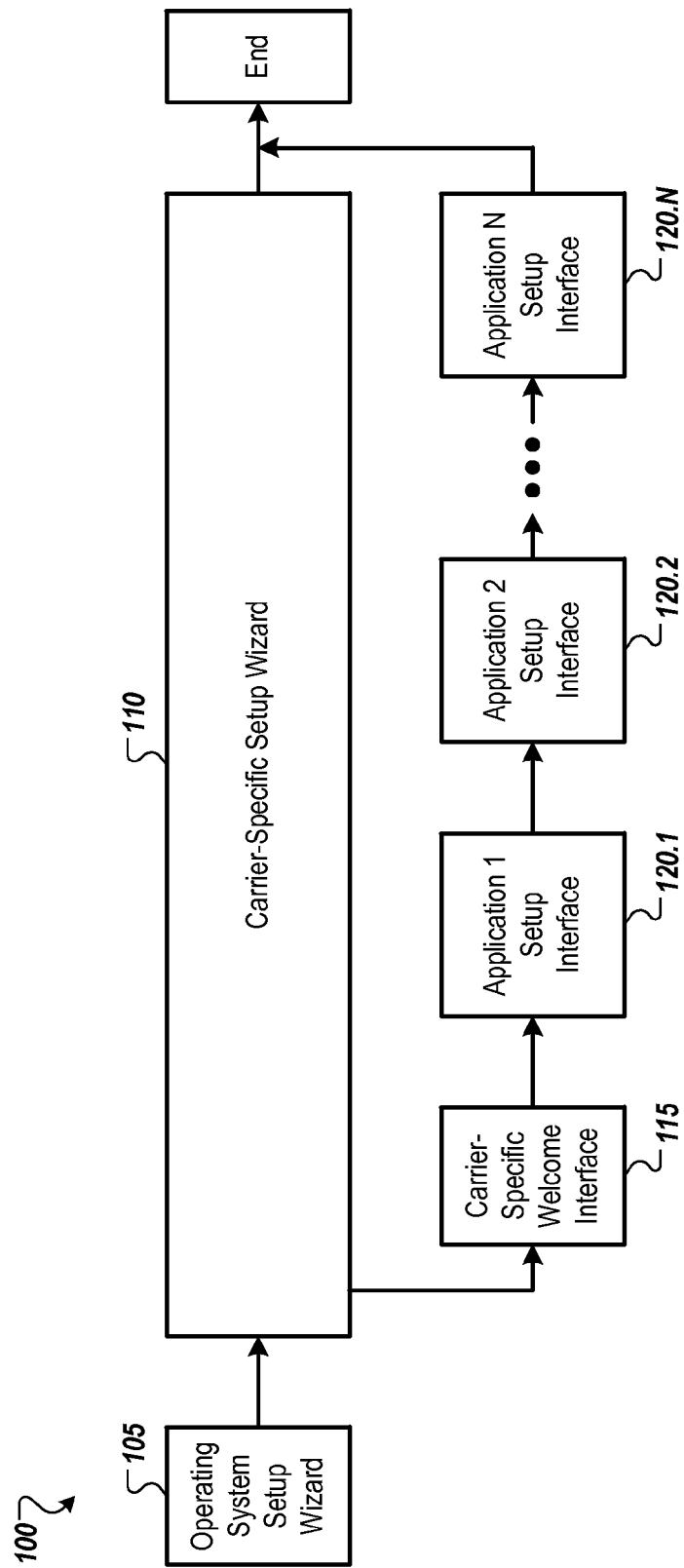
FIG. 1 illustrates an exemplary data/control flow for setting up carrier applications using a carrier-specific setup wizard.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, a new approach for setting up carrier-provided applications at out-of-box experience (OOBE) may be desirable, especially in operating systems that do not provide inter-process communication (IPC) between applications at OOBE. According to some implementations, when the computing device is first powered on at OOBE or after a system reset, an operating system setup wizard of the computing device is launched. The operating system setup wizard goes through the standard operating system setup process which may include, for example, downloading updates and bug fixes for the operating system and requesting an input of the user's name and address. The operating system setup wizard launches a carrier-specific setup wizard. The carrier-specific setup wizard presents a setup interface for each carrier application.

The carrier applications are applications provided by the carrier to add value to the experience of users of the carrier's service. Specifically, the carrier applications allow the carrier to sell additional services (e.g., cloud storage) in addition to voice and data plans, or to attract users to the carrier (or to attract existing users to more expensive plans offered by the carrier) by providing these services for free to subscribers of some voice or data plans. The carrier applications may include, for example, a cloud storage application, a messaging application, a contact management application, and a photograph management application. Advantageously, the combination of the operating system setup wizard and the carrier-specific setup wizard may provide a seamless and user-friendly interface for setting up all of the applications provided by the operating system and the carrier at OOBE.

According to some other implementations, when the computing device is first powered on at OOBE or after a system reset, the operating system setup wizard of the computing device is launched. During execution, the operating system setup wizard prompts for the user to provide data for one or more carrier applications. If the user is an existing user of the carrier who is upgrading his/her computing device, the provided data may include an existing username and password for a cloud storage locker, and permission to access the user's stored messages, contacts, photographs, and/or documents. If the user is a new user of the carrier, who is switching from another carrier or acquiring his/her first computing device, the provided data may include a new username and password for a new cloud storage locker, and permission to store the user's messages, contacts, photographs, and/or documents in the cloud storage locker, as well as in the local memory of the computing device. The user-provided data is stored, for the carrier applications, in a protected shared memory location of the computing device. The protected shared memory location is accessible to the carrier applications upon launch of the carrier applications. The carrier applications are then launched for retrieving the user-provided data from the protected shared memory location. In some examples, the carrier applications are launched in the background so as not to interfere with the user's access to other functions of the computing device.

As used herein, the phrase "computing device" may refer to any computing device, for example, a mobile phone, a tablet computer, a personal digital assistant (PDA), a digital music player, a laptop computer, a desktop computer, etc. A computing device may include a processor and a memory. In addition, the phrase "computing device" encompasses its plain and ordinary meaning. Examples of computing devices are discussed below in conjunction with FIGS. 6-8.

As used herein, the term "carrier" may refer to a party, different from the manufacturer or developer of the operating system of the computing device, which may preinstall software in an OOBE computing device. For example, a carrier may be a mobile network operator or mobile carrier, such as Verizon Wireless®. However, a carrier is not limited to a mobile network operator or a mobile carrier and may include, for example, an employer that preinstalls software in computing devices provided to its employees. In addition, the term "carrier" encompasses its plain and ordinary meaning.

FIG. 1 illustrates an exemplary data/control flow 100 for setting up carrier applications using a carrier-specific setup wizard at a computing device. The data/control flow 100 begins when the operating system setup wizard 105 is launched, for example, when the computing device is first powered on at OOBE or after a system reset. The operating system setup wizard 105 sets up the operating system and obtains, over a network, any updates or bug fixes for the operating system. The operating system setup wizard passes control to a carrier-specific setup wizard 110. The carrier-specific setup wizard 110 presents a carrier-specific welcome interface 115. For example, the carrier-specific welcome interface 115 may include presenting the carrier's logo and the word, "Welcome," on the screen. The carrier-specific welcome interface 115 may also include prompts for any information the carrier needs from the user, such as a confirmation of the user's service plan, name, and billing address. The carrier-specific setup wizard 110 presents application setup interfaces 120.1-N for the carrier applications. Each application setup interface 120.1-N may prompt the user to input information or provide authorizations to access stored data needed by the application. After the carrier-specific welcome interface 115 and the application setup interfaces 120.1-N are presented via the carrier-specific setup wizard 110, the data/control flow 100 ends.

The application setup interfaces 120.1-N may be presented according to a predetermined order of the N applications, numbered 1 to N. In some cases, the user may select a back button while one of the application setup interfaces 120.k (where k is a number between 1 and N) is presented. In response to the selection of the back button, the application setup interface for the previous application in the 1-N order, application setup interface 120.k–1 may be presented. In some cases, the user may select a forward button while one of the application setup interfaces 120.k (where k is a number between 1 and N) is presented. In response to the selection of the forward button, the application setup interface for the next application in the 1-N order, application setup interface 120.k+1 may be presented. The application setup interfaces 120.1-N for the carrier applications may be presented together with "back" and "forward" buttons generated by the carrier specific setup wizard 110. The "back" and "forward" buttons are used to maintain a consistent look and feel for the OOBE setup experience, such that the user feels that he/she is accessing a single setup wizard and not multiple different and disconnected setup wizards.

The carrier applications may be identified based on a uniform resource indicator (URI) scheme and a package name associated with the carrier. Other applications loaded on the computing device, for example, by the manufacturer or the user, may not have the URI scheme and the package name associated with the carrier. In other words, according to some implementations, each and every application having the URI scheme and the package name associated with the carrier is a carrier application, and each and every application lacking either the URI scheme or the package name associated with the carrier is not a carrier application. The URI scheme or the package name may be authenticated and verified. An example of the URI scheme is carrier-setup-wizard? direction=<direction>, where <direction> is set to forward or backward based on whether the user selected the "forward" button or the "back" button.

In addition, each carrier application that participates in the carrier-specific setup wizard 110 may have to declare the carrier-setup-wizard scheme in its manifests, for example, as shown in the pseudocode below.

```
<Extensions>
  <uap:Extension Category="windows.protocol">
    <uap:Protocol          Name="carrier-setup-wizard"
      ReturnResults="always">
      <uap:DisplayName>Setup    Wizard</uap:DisplayName>
    </uap:Protocol>
  </uap:Extension>
</Extensions>
```

One or more of the carrier applications may include an Internet client server capability, as shown in the pseudocode below.

```
<Capabilities>
  <Capability Name="internetClientServer"/>
</Capabilities>
```

When the carrier-setup-wizard scheme is invoked by the carrier-specific setup wizard 110 with a targeted family package name, each application setup wizard 120.1-N may be invoked through a specified entry point and with specified arguments provided to the application setup wizard 120.1-N. Each application setup wizard 120.1-N may check that it was invoked using the correct scheme and may verify that the caller is the carrier-specific setup wizard 110 and not another caller. If the invocation scheme is correct and the caller is the carrier-specific setup wizard 110, the application setup wizard 120.1-N may display its user input requests, in addition to the "back" button and the "forward" button from the carrier-specific setup wizard 110. The following pseudocode may be used.

```
protected override void OnActivated(IActivatedEventArgs args)
{
  Frame rootFrame=Window.Current.Content as Frame;
  if(rootFrame==null)
  {
    rootFrame=new Frame( );
    rootFrame.CacheSize=1;
    Window.Current.Content=rootFrame;
  }
  var protocolActivationArgs=args as ProtocolForResultsActivatedEventArgs;
  if(protocolActivationArgs!=null)
  {
    If (protocolActivationArgs.Uri.Scheme=="carrier-setup-wizard" && IsTrustedCaller(protocolActivationArgs.CallerPackageFamilyName))
    {
      (Window.Current.Content as Frame).Navigate(typeof (SettingsPage), protocolActivationArgs);
    }
  }
  Window.Current.Activate( );
}
```

After the configuration of each application setup interface 120.k (where k is a number between 1 and N) is complete, the application setup interface 120.k sends a response back to the carrier-specific setup wizard 110 indicating the navigation direction (back or forward) selected by the user. Depending on the selected navigation direction, the application setup interface 120.$k$+1 or the application setup interface 120.$k$−1 may be presented. The following pseudocode may be used.
var responseData=new ValueSet( );
responseData.Add("direction", ["backward" or "forward"]);
m_protocolActivationInfo.ProtocolForResultsOperation.
ReportCompleted(responseData);

In the above pseudocode, m_protocolActivationInfo is the ProtocolForResultsActivated EventArgs instance retrieved during the application start.

The carrier-specific setup wizard 110 launches the application setup interface 120.1-N. Each application setup interface 120.1-N is responsible for displaying its own input prompts and managing its internal navigation if it has multiple screens of input prompts to display. In addition, information inputted during one application setup interface 120.$k$1 may be automatically provided to another application setup interface 120.$k$2, if k1 and k2 are numbers between 1 and N and k1<k2. For example, if application setup interface 120.$k$1 prompts for the user's email address, the user's email address may be automatically provide to application setup interface 120.$k$2, without requiring re-prompting the user to enter his/her email address for a second time. In other words, one carrier application may be setup based on information provided in the setup interface of the one carrier application and based on information provided in the setup interface of a previous carrier application preceding the one carrier application in the ordered list.

A "back" and "forward" button may from the carrier-specific setup interface 110 may be displayed together with each application setup interface 120.1-N for navigation through the application setup interfaces 120.1-N. The "back" and "forward" buttons may be in the same location of the screen or display unit for all of the application setup interfaces 120.1-N, to maintain a consistent look and feel of the application setup interfaces 120.1-N. The pseudocode below may be used.

```
<Grid>
  <Grid.RowDefinitions>
    <RowDefinition Height="*"></RowDefinition>
    <RowDefinition Height="auto"></RowDefinition>
  </Grid.RowDefinitions>
  <Grid Grid.Row="0">
    <!--app content here-->
  </Grid>
  <Grid
Grid.Row="1">
    <Grid.ColumnDefinitions>
      <ColumnDefinition Width="*"></ColumnDefinition>
      <ColumnDefinition Width="*"></ColumnDefinition>
    </Grid.ColumnDefinitions>
    <Button Content="Back"
      Style="{StaticResource WizardButton}"/>
    <Button Content="Forward"
      Grid.Column="1"
      Style="{StaticResource WizardButton}"/>
  </Grid>
</Grid>
```

In the above pseudocode, the WizardButton style may be defined as follows.

```
<Style x:Key="WizardButton" TargetType="Button">
  <Setter Property="Margin" Value="12"/>
  <Setter Property="HorizontalAlignment"
    Value="Stretch"/>
  <Setter Property="VerticalAlignment" Value="Stretch"/>
  <SetterProperty="Background" Value="{Theme
    ResourceButtonBackgroundThemeBrush}"></Setter>
</Style>
```

Figure 2:
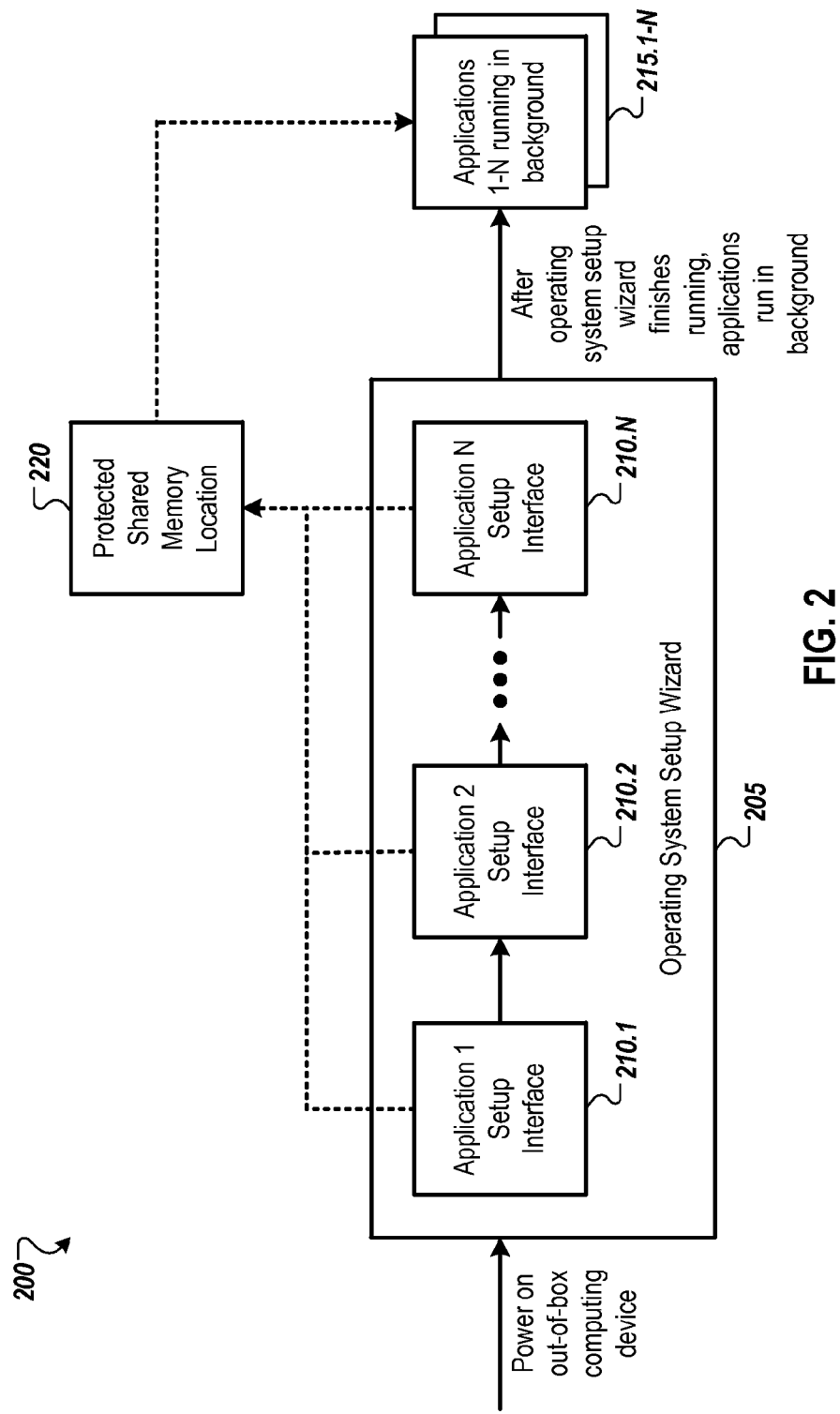
FIG. 2 illustrates exemplary data/control flow for setting up carrier applications using a protected shared memory location.

FIG. 2 illustrates exemplary data/control flow 200 for setting up carrier applications using a protected shared memory location. As shown, the data/control flow 200 starts when a user powers on an out-of-box experience computing device. Alternatively, the user may power on a computing device that has been reset (e.g., to transfer the computing device to a new owner). After the out-of-box experience computing device is powered on, the operating system setup wizard 205 is launched. The operating system setup wizard 205 sets up the operating system and obtains, over a network, any updates or bug fixes for the operating system. In addition, the operating system setup wizard 205 presents application setup interfaces 210.1-N for the carrier applications. Each application setup interface 210.1-N may prompt the user to input information or provide authorizations to access stored data needed by the application. The information or authorizations inputted by the user via the application setup interfaces 210.1-N may be stored in the protected shared memory location 220.

After the operating system setup wizard 205, and all of the application setup interfaces 210.1-N therein, finish running, the carrier applications 215.1-N run. The carrier applications 215.1-N may run in the background to avoid disturbing the user who may be accessing other applications of the computing device. While running, the carrier applications 215.1-N access the protected shared memory location 220 to initialize based on the information or authorizations provided by the user. The carrier applications 215.1-N may read the information or authorizations from the protected shared memory location 220, and setup services (e.g., a contact management service) at the computing device based on the information and authorizations.

Figure 3:
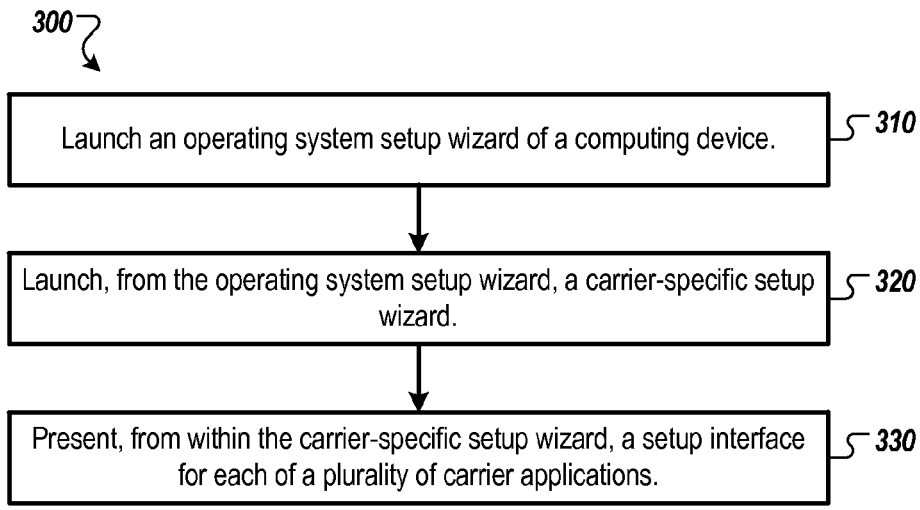
FIG. 3 illustrates an exemplary process for setting up carrier applications using a carrier-specific setup wizard.

FIG. 3 illustrates an exemplary process 300 for setting up carrier applications using a carrier-specific setup wizard. The process 300 may be initiated, for example, when a user first powers on an OOBE computing device or a computing device that has had a system reset.

As shown, the process 300 starts at step 310, where a computing device launches an operating system setup wizard of the computing device. The operating system setup wizard may be associated with an operating system of the computing device. The operating system of the computing device may prevent inter-process communication between two or more applications unless each of the two or more applications has been launched previously. As may be understood, when an OOBE device is first powered on, none of the applications on the device have been launched previously. For example, the operating system of the computing device may be Windows Phone® or any other operating system.

At step 320, the computing device launches, from the operating system setup wizard, a carrier-specific setup wizard. The carrier-specific setup wizard may be a different application from the operating system setup wizard. Alternatively, the carrier-specific setup wizard may be a component of the operating system setup wizard that executes within the operating system setup wizard.

At step 330, the computing device presents, from within the carrier-specific setup wizard, a setup interface for each of a plurality of carrier applications. Each setup interface may prompt the user to input information (e.g., a username and password for accessing a cloud storage locker) or provide authorizations (e.g., authorization to access a list of the user's contacts stored on the network) requested by the corresponding carrier application. The plurality of carrier applications may be arranged in an ordered list, and the setup interfaces for each of the plurality of carrier applications may be presented according to the order in the ordered list. According to some implementations, the user may select a back button while a setup interface for one of the plurality of carrier applications is presented. Responsive to the selection of the back button, the computing device may present a setup interface for a previous carrier application according to the ordered list.

The plurality of carrier applications may include one or more of a cloud storage application, a messaging application (e.g., for text messages, multimedia messages, voice messages, or email messages), a contact management application, and a photograph management application. The setup interface for at least one of the plurality of carrier applications may include prompts for the user to enter information or authorize downloading of information from network-based storage. For example, the user may be prompted to enter a username and password for accessing the cloud storage application. The user may be prompted for authorization to access photographs stored on the network for the photograph management application. The photographs may have been stored on the network from another computing device that the user owned or used prior to acquiring the computing device implementing the process 300. After step 330, the process 300 ends.

Figure 4:
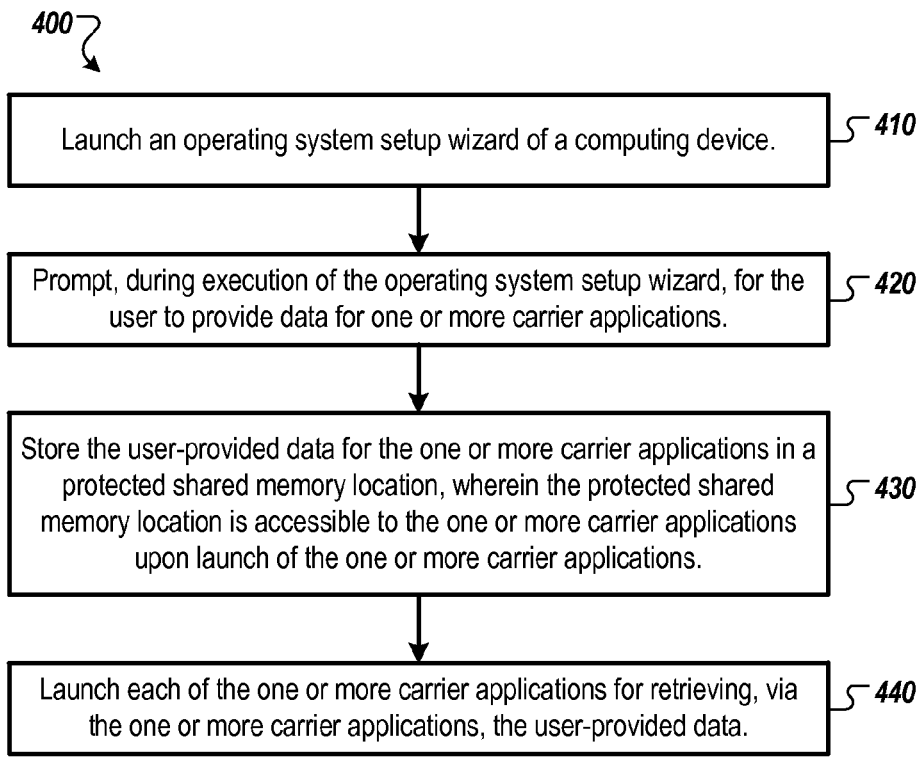
FIG. 4 illustrates an exemplary process for setting up carrier applications using a protected shared memory location.

FIG. 4 illustrates an exemplary process 400 for setting up carrier applications using a protected shared memory location. The process 400 may be initiated, for example, when a user first powers on an OOBE computing device or a computing device that has had a system reset.

The process 400 begins at step 410, where a computing device launches an operating system setup wizard of the computing device. The operating system setup wizard may be associated with an operating system of the computing device. The operating system of the computing device may prevent inter-process communication between two or more applications unless each of the two or more applications has been launched previously. As may be understood, when an OOBE device is first powered on, none of the applications on the device have been launched previously. For example, the operating system of the computing device may be Windows Phone® or any other operating system.

At step 420, the computing device prompts, during execution of the operating system setup wizard, for the user to provide data for one or more carrier applications. For example, the user may be prompted to input information or provide authorizations for the one or more carrier applications. The inputted information may include usernames or passwords. The provided authorizations may include authorizations to access data stored in association with the user in cloud storage, or authorizations to store data related to the user in cloud storage. For instance, a user may authorize his/her contact list to be downloaded from cloud storage and for possible future changes to the contact list (e.g., addition of new contacts) to be uploaded to cloud storage. The carrier applications may include one or more of a cloud storage application, a messaging application (e.g., for text messages, multimedia messages, voice messages, or email messages), a contact management application, and a photograph management application. In response to the prompt, the user may input and the computing device may receive the requested data for the one or more carrier applications.

At step 430, the computing device stores the user-provided data for the one or more carrier applications in a protected shared memory location (e.g., protected shared memory location 220) of the computing device. The protected shared memory location is accessible to the carrier applications upon launch of the carrier applications. Thus, the carrier applications are able to access the user-provided data when they are launched.

At step 440, the computing device launches each of the carrier applications for retrieving, via the carrier applications, the user-provided data. The carrier applications may retrieve the user-provided data from the protected shared memory location. The carrier applications may be launched in the background, so as not to disturb the user if the user is accessing another application on the mobile phone. After launch, the carrier applications may be set up based on the user-provided data. For example, the user's contact list application may be set up based on the user's authorization to access a network-based contact list or the user's username and password for accessing the network-based contact list.

According to some examples, the user-provided data may be stored in the protected shared memory location, for access by the carrier applications, according to a predefined schema. The predefined schema may be the JavaScript Object Notation (JSON) format, Hypertext Markup Language (HTML) or Extensible Markup Language (XML). After step 440, the process 400 ends.

Figure 5:
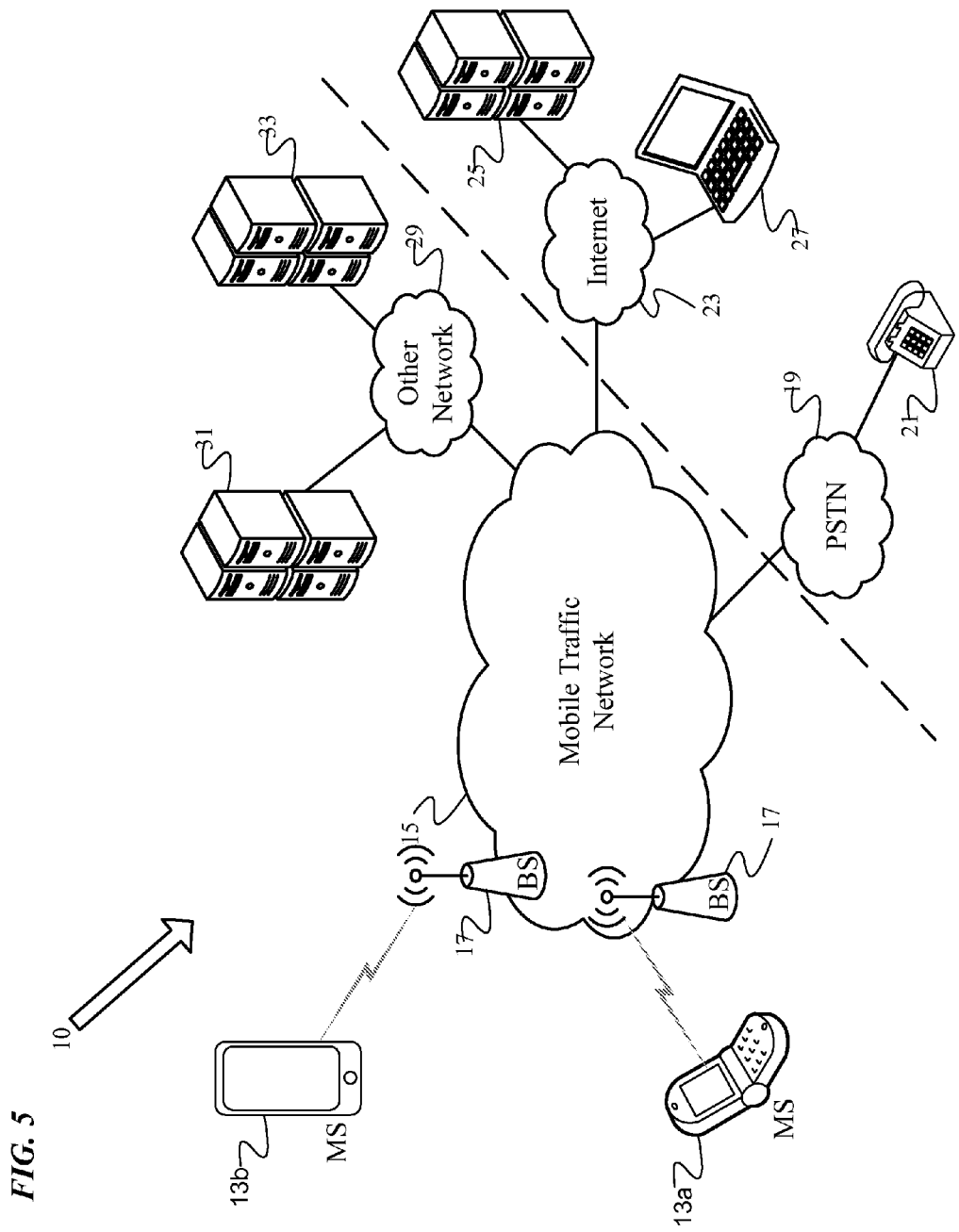
FIG. 5 is a high-level functional block diagram of an exemplary system of networks/devices that provide various communications for mobile stations

FIG. 5 illustrates an exemplary system 10 offering a variety of mobile communication services in a mobile carrier system, which may provide network access services to the computing device described in conjunction with FIGS. 1-4. The mobile stations and personal computers of FIG. 5 may correspond to the computing device described in conjunction with FIGS. 1-4. The example of FIG. 5 shows two mobile stations (MSs) 13a and 13b as well as a mobile communication network 15. The network 15 provides mobile wireless communications services to those stations as well as to other mobile stations (not shown), for example, via a number of base stations (BSs) 17. The present techniques may be implemented in or used in any of a variety of available mobile networks 15, and the drawing shows only a very simplified example of a few relevant elements of the network 15 for purposes of discussion here.

The wireless mobile communication network 15 might be implemented as a network conforming to the long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Phone based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier may also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. As illustrated in FIG. 5, the servers 25 and 31 may communicate with one another over one or more networks.

A mobile station 13 communicates over the air with a base station 17. The mobile station 13 communicates through the traffic network 15 for various voice and data communications, e.g. through the Internet 23 with a server 25 and/or with application servers 31. Services, such as carrier applications, offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

As shown by the above discussion, functions relating to voice and data communication may be implemented on computers connected for data communication via the components of a packet data network, as shown in FIG. 5. Although special purpose devices may be used, such devices also may be implemented using one or more hardware platforms intended to represent a general class of data processing device commonly used to run "server" programming so as to implement the functions discussed above, albeit with an appropriate network connection for data communication. The mobile stations 13a and 13b may correspond to the computing device discussed in conjunction with FIGS. 1-4.

The subject technology may be implemented in conjunction with touch screen type mobile stations as well as to non-touch type mobile stations. Hence, our simple example shows the mobile station (MS) 13a as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations. However, for the sake of completeness two types of mobile stations are described below with respect to FIGS. 6 and 7.

Figure 6:
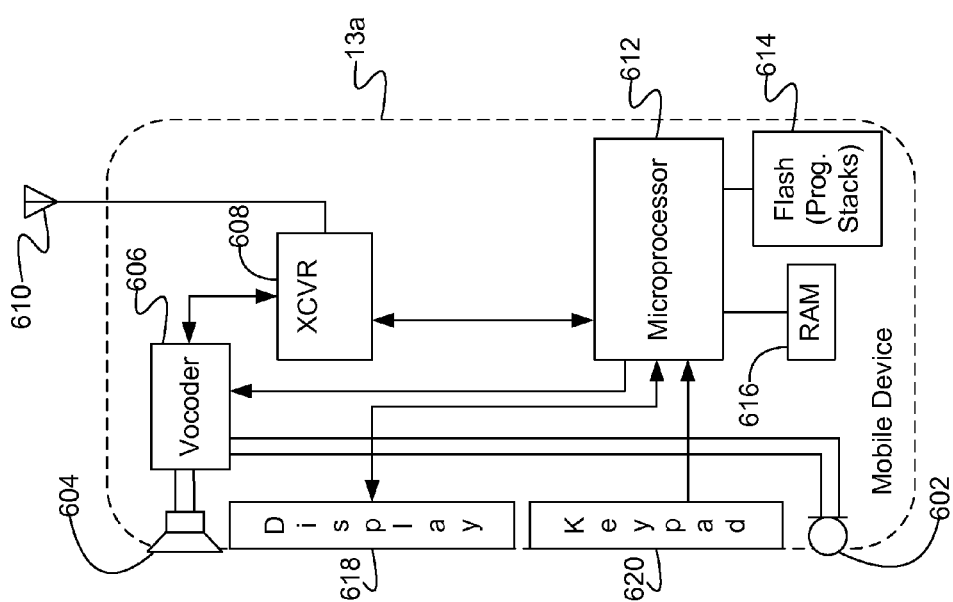
FIG. 6 is a high-level functional block diagram of an exemplary non-touch type mobile station which may set up carrier applications.

FIG. 6 provides a block diagram illustration of an exemplary non-touch type mobile station 13a, which may correspond to the mobile station 13. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the mobile station 13a includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13a also includes at least one digital transceiver (XCVR) 608. The mobile station 13a may be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology.

The transceiver 608 provides two-way wireless communication of information, such as vocoded speech samples and/or digital information, in accordance with the technology of the network system 100. The transceiver 608 also sends and receives a variety of signaling messages in support of the various voice and data services provided via the mobile station 13a and the communication network. Each transceiver 608 connects through RF send and receive amplifiers (not separately shown) to an antenna 610. The transceiver may also support various types of mobile messaging services, such as short message service (SMS), enhanced messaging service (EMS) and/or multimedia messaging service (MMS).

The mobile station 13a includes a display 618 for displaying messages, menus or the like, call related information dialed by the user, calling party numbers, etc. A keypad 620 enables dialing digits for voice and/or data calls as well as generating selection inputs, for example, as may be keyed-in by the user based on a displayed menu or as a cursor control and selection of a highlighted item on a displayed screen. The display 618 and keypad 620 are the physical elements providing a textual or graphical user interface. Various combinations of the keypad 620, display 618, microphone 602 and speaker 604 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 612 serves as a programmable controller for the mobile station 13a, in that it controls all operations of the mobile station 13a in accordance with programming that it executes, for all normal operations, including those under consideration here. In the example, the mobile station 13a includes flash type program memory 614, for storage of various "software" or "firmware" program routines and mobile configuration settings, such as mobile directory number (MDN) and/or mobile identification number (MIN), etc. The flash type program memory 614 stores programmed instructions, including those described herein. The mobile station 13a may include a non-volatile random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software and short message service software. The memories 614, 616 also store various data, such as telephone numbers and server addresses, downloaded data such as multimedia content, and various data input by the user. Programming stored in the flash type program memory 614, sometimes referred to as "firmware," is loaded into and executed by the microprocessor 612.

As outlined above, the mobile station 13a includes a processor, and programming stored in the flash memory 614 configures the processor so that the mobile station is capable of performing various desired functions, including those described herein.

For purposes of such a discussion, FIG. 6 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 6. For example, the touch screen type mobile station 13b includes a microphone 602, speaker 604 and vocoder 606, for audio input and output functions, much like in the earlier example. The mobile station 13b also includes at least one digital transceiver (XCVR) 608, for digital wireless communications, although the mobile station 13b may include an additional digital or analog transceiver. The concepts discussed here encompass embodiments of the mobile station 13b utilizing any digital transceivers that conform to current or future developed digital wireless communication standards. As in the mobile station 13a, the transceiver 608 provides two-way wireless communication of information, such as vocoded speech samples and/or digital information. The transceiver 608 also sends and receives a variety of signaling messages in support of the various voice and data services provided via the mobile station 13b. Each transceiver 608 connects through RF send and receive amplifiers (not separately shown) to an antenna 610. The transceiver may also support various types of mobile messaging services, such as short message service (SMS), enhanced messaging service (EMS) and/or multimedia messaging service (MMS).

As in the example of the mobile station 13a, a microprocessor 612 serves as a programmable controller for the mobile station 13b, in that it controls all operations of the mobile station 13b in accordance with programming that it executes, for all normal operations, and for operations described herein. In the example, the mobile station 13b includes flash type program memory 614, for storage of various program routines and mobile configuration settings. The mobile station 13b may also include a non-volatile random access memory (RAM) 616 for a working data processing memory. Of course, other storage devices or configurations may be added to or substituted for those in the example. Hence, outlined above, the mobile station 13b includes a processor, and programming stored in the flash memory 614 configures the processor so that the mobile station is capable of performing various desired functions, including the functions described herein.

Figure 7:
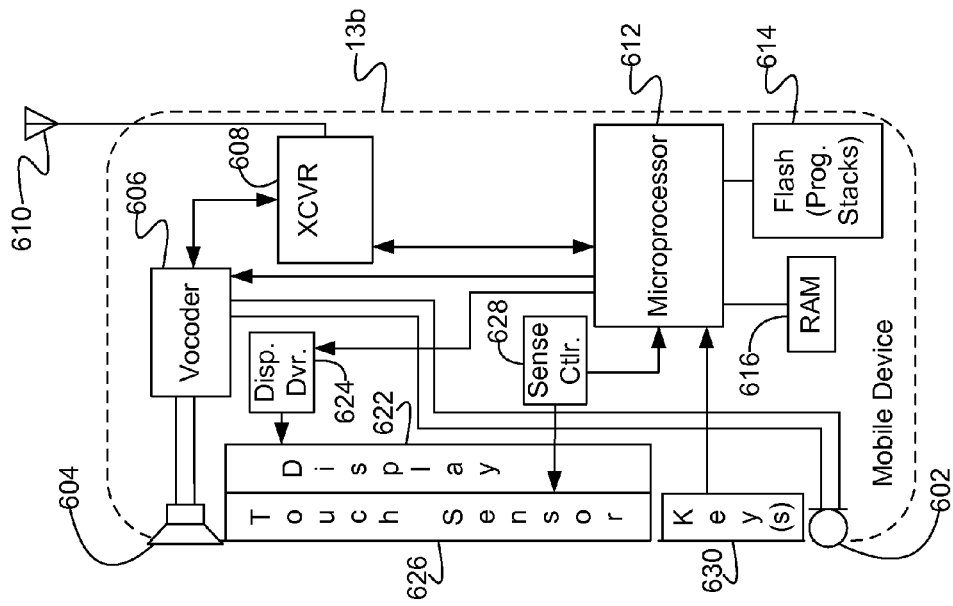
FIG. 7 is a high-level functional block diagram of an exemplary touch screen type mobile station which may set up carrier applications.

In the example of FIG. 7, the user interface elements included a display and a keypad. The mobile station 13b may have a limited number of key(s) 630, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 622, which the microprocessor 612 controls via a display driver 624, to present visible outputs to the device user. The mobile station 13b also includes a touch/position sensor 626. The sensor 626 is relatively transparent, so that the user may view the information presented on the display 622. A sense circuit 628 sensing signals from elements of the touch/position sensor 626 and detects occurrence and position of each touch of the screen formed by the display 622 and sensor 626. The sense circuit 628 provides touch position information to the microprocessor 612, which can correlate that information to the information currently displayed via the display 622, to determine the nature of user input via the screen.

The display 622 and touch sensor 626 (and possibly one or more keys 630, if included) are the physical elements providing the textual and graphical user interface for the mobile station 13b. The microphone 602 and speaker 604 may be used as user interface elements for audio input and output.

The structure and operation of the mobile stations 13a and 13b, as outlined above, were described to by way of example, only.

Figure 8:
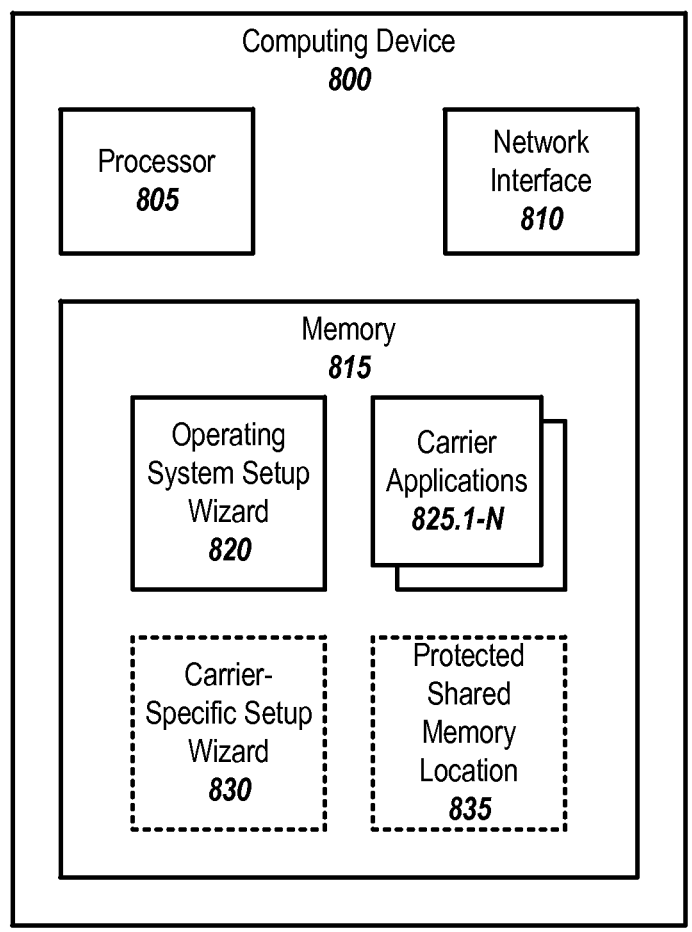
FIG. 8 is a high-level functional block diagram of an exemplary computing device on which carrier applications may be set up.

FIG. 8 is a high-level functional block diagram of an exemplary computing device 800 on which carrier applications may be set up. The computing device 800 may be, for example, a mobile phone, a tablet computer, a personal digital assistant (PDA), a digital music player, a laptop computer, a desktop computer, etc. As shown, the computing device 800 includes a processor 805, a network interface 810, and a memory 815. The processor 805 executes programmed or hard-wired instructions which are stored in a computer-readable medium, such as the memory 815. The network interface 810 allows the computing device to access a network, such as a cellular network or a WiFi network. The memory 815 stores data or instructions. As shown, the memory includes an operating system setup wizard 820, carrier applications 825.1-N. The memory also optionally includes a carrier-specific setup wizard 830 and a protected shared memory location 835.

The operating system setup wizard 820 sets up the operating system of the computing device 800 and obtains, over a network accessible through the network interface 810, any updates or bug fixes for the operating system. The carrier applications 825 are applications provided by the carrier to the computing device 800. The carrier applications 825 are applications provided by the carrier to add value to the experience of users of the carrier's service. Specifically, the carrier applications 825 allow the carrier to sell additional services (e.g., cloud storage) in addition to voice and data plans, or to attract users to the carrier by providing these services for free to subscribers of some voice or data plans.

The carrier applications 825 may include, for example, a cloud storage application, a messaging application, a contact management application, and a photograph management application. The cloud storage application may store the user's documents (e.g., word processing documents, spreadsheets or slide show documents) in the cloud. The messaging application may store the user's voice, text, multimedia or email messages in the cloud. The contact management application may allow the user to search his/her contacts and store a copy of the contact list in the cloud. The photograph management application may allow the user to create photograph albums and store a copy of the photographs in the cloud.

In some cases, the computing device 800 includes the carrier-specific setup wizard 830. The operation of the carrier-specific setup wizard 830 is described above in conjunction with FIGS. 1 and 3. For example, the carrier-specific setup wizard 830 may correspond to the carrier-specific setup wizard 110 of FIG. 1.

In some cases, the computing device includes the protected shared memory location 835. The operation of the protected shared memory location 835 is described above in conjunction with FIGS. 2 and 4. For example, the protected shared memory location 835 may correspond to the protected shared memory location 220 of FIG. 2.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
launching, at a computing device, an operating system setup wizard, wherein an operating system of the computing device prevents inter-process communication between two or more applications unless each of the two or more application has been launched previously;
launching, from the operating system setup wizard, a carrier-specific setup wizard; and
presenting, from within the carrier-specific setup wizard, a setup interface for each of a plurality of carrier applications, wherein the plurality of carrier applications are identified according to a uniform resource indicator (URI) scheme and a package name associated with the carrier, wherein the plurality of carrier applications are arranged in an ordered list, wherein the setup interfaces for the plurality of carrier applications are presented according to an order in the ordered list, and wherein at least one carrier application is setup based on information provided in the setup interface of the at least one carrier application and based on information provided in the setup interface of a previous carrier application preceding the at least one carrier application in the ordered list.

2. The method of claim 1, further comprising:
presenting, in conjunction with the setup interface for each of the plurality of carrier applications, a back button and a forward button, wherein the back button and the forward button are presented in a same position on a display unit while different setup interfaces are presented.

3. The method of claim 2, further comprising:
receiving a selection of a back button while the setup interface for one of the plurality of carrier applications is presented;
responsive to the selection of the back button, presenting a setup interface for a previous carrier application according to the ordered list.

4. The method of claim 2, further comprising:
receiving a selection of a forward button while the setup interface for one of the plurality of carrier applications is presented;
responsive to the selection of the forward button, presenting a setup interface for a next carrier application according to the ordered list.

5. The method of claim 1, wherein the setup interface for at least one of the plurality of carrier applications includes prompts for the user to enter information or authorize downloading of user information from network-based storage.

6. The method of claim 1, wherein the plurality of carrier applications comprise one or more of: a cloud storage application, a messaging application, a contact management application, and a photograph management application.

7. The method of claim 1, wherein the operating system setup wizard is launched in response to an out-of-box experience power on of the computing device.

8. The method of claim 1, wherein each and every application having the URI scheme and the package name associated with the carrier is a carrier application, and wherein each and every application lacking either the URI scheme or the package name associated with the carrier is not a carrier application.

9. A non-transitory computer-readable medium comprising instructions which, when executed by a computing device, cause the computing device to:
launch, at the computing device, an operating system setup wizard, wherein an operating system of the computing device prevents inter-process communication between two or more applications unless each of the two or more application has been launched previously;

launch, from the operating system setup wizard, a carrier-specific setup wizard; and present, from within the carrier-specific setup wizard, a setup interface for each of a plurality of carrier applications, wherein the plurality of carrier applications are identified according to a uniform resource indicator (URI) scheme and a package name associated with the carrier, wherein the plurality of carrier applications are arranged in an ordered list, wherein the setup interfaces for the plurality of carrier applications are presented according to an order in the ordered list, and wherein at least one carrier application is setup based on information provided in the setup interface of the at least one carrier application and based on information provided in the setup interface of a previous carrier application preceding the at least one carrier application in the ordered list.

10. The computer-readable medium of claim 9, further comprising instructions which, when executed by the computing device, cause the computing device to:

present, in conjunction with the setup interface for each of the plurality of carrier applications, a back button and a forward button, wherein the back button and the forward button are presented in a same position on a display unit while different setup interfaces are presented.

11. The computer-readable medium of claim 10, further comprising instructions which, when executed by the computing device, cause the computing device to:

receiving a selection of a back button while the setup interface for one of the plurality of carrier applications is presented;

responsive to the selection of the back button, presenting a setup interface for a previous carrier application according to the ordered list.

12. The computer-readable medium of claim 10, further comprising instructions which, when executed by the computing device, cause the computing device to:

receiving a selection of a forward button while the setup interface for one of the plurality of carrier applications is presented;

responsive to the selection of the forward button, presenting a setup interface for a next carrier application according to the ordered list.

13. The computer-readable medium of claim 9, wherein the setup interface for at least one of the plurality of carrier applications includes prompts for the user to enter information or authorize downloading of user information from network-based storage.

14. The computer-readable medium of claim 9, wherein the plurality of carrier applications comprise one or more of: a cloud storage application, a messaging application, a contact management application, and a photograph management application.

15. The computer-readable medium of claim 9, wherein the operating system setup wizard is launched in response to an out-of-box experience power on of the computing device.

16. The computer-readable medium of claim 9, wherein each and every application having the URI scheme and the package name associated with the carrier is a carrier application, and wherein each and every application lacking either the URI scheme or the package name associated with the carrier is not a carrier application.

17. A computing device comprising:

a processor; and a memory comprising instructions which, when executed by the processor, cause the processor to:

launch, at the computing device, an operating system setup wizard, wherein an operating system of the computing device prevents inter-process communication between two or more applications unless each of the two or more application has been launched previously;

launch, from the operating system setup wizard, a carrier-specific setup wizard; and present, from within the carrier-specific setup wizard, a setup interface for each of a plurality of carrier applications, wherein the plurality of carrier applications are identified according to a uniform resource indicator (URI) scheme and a package name associated with the carrier, wherein the plurality of carrier applications are arranged in an ordered list, wherein the setup interfaces for the plurality of carrier applications are presented according to an order in the ordered list, and wherein at least one carrier application is setup based on information provided in the setup interface of the at least one carrier application and based on information provided in the setup interface of a previous carrier application preceding the at least one carrier application in the ordered list.

18. The computing device of claim 17, the memory further comprising instructions which, when executed by the processor, cause the processor to:

present, in conjunction with the setup interface for each of the plurality of carrier applications, a back button and a forward button, wherein the back button and the forward button are presented in a same position on a display unit while different setup interfaces are presented.

19. The computing device of claim 18, the memory further comprising instructions which, when executed by the processor, cause the processor to:

receiving a selection of a back button while the setup interface for one of the plurality of carrier applications is presented;

responsive to the selection of the back button, presenting a setup interface for a previous carrier application according to the ordered list.

20. The computing device of claim 18, the memory further comprising instructions which, when executed by the processor, cause the processor to:

receiving a selection of a forward button while the setup interface for one of the plurality of carrier applications is presented;

responsive to the selection of the forward button, presenting a setup interface for a next carrier application according to the ordered list.

* * * * *